United States Patent [19]

Speight

[11] Patent Number: 5,023,046
[45] Date of Patent: Jun. 11, 1991

[54] DRIVE UNIT FOR INSPECTING NUCLEAR FUEL RODS

[75] Inventor: Charles W. Speight, Lynchburg, Va.

[73] Assignee: The Babcock & Wilcox Company, New Orleans, La.

[21] Appl. No.: 467,468

[22] Filed: Jan. 16, 1990

[51] Int. Cl.⁵ ............................................. G21C 17/00
[52] U.S. Cl. .................................. 376/261; 376/245; 376/252; 294/906; 294/119.3
[58] Field of Search ............... 376/260, 261, 270, 245, 376/251, 252, 223; 73/622, 637, 864, 864.31; 294/906, 119.3

[56]  References Cited

U.S. PATENT DOCUMENTS 4,550,605 11/1985 Bains ...................................... 73/622
4,660,419 4/1987 Derkacs et al. ....................... 73/622
4,918,991 4/1990 Bucher et al. ....................... 376/261

Primary Examiner—Daniel D. Wasil
Attorney, Agent, or Firm—Robert J. Edwards; D. Neil LaHaye

[57] ABSTRACT

A drive unit for gripping and rotating a fuel rod during inspection of the fuel rod. A housing has a drive motor mounted at its first end with a spindle rotatably mounted in the housing and directly coupled to the drive motor. A recess at one end of the spindle adjacent the second end of the housing receives a substantially donut shaped rubber bladder. A flanged port that extends radially from the bladder and is in fluid communication with the interior of the bladder provides a means for pressurizing the bladder. This causes radial inward expansion of the bladder for gripping a fuel rod to be inspected.

7 Claims, 2 Drawing Sheets

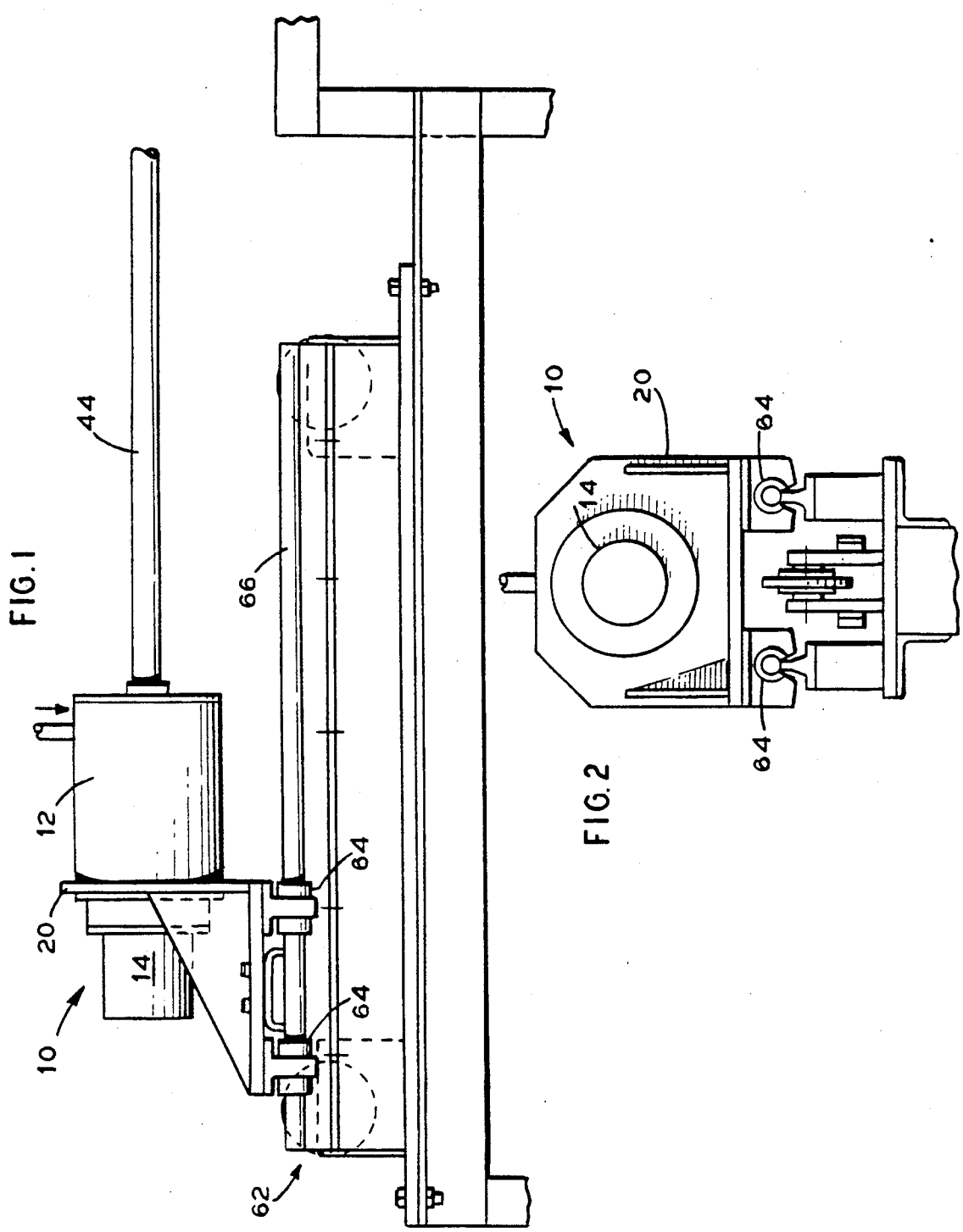

DRIVE UNIT FOR INSPECTING NUCLEAR FUEL RODS

BACKGROUND OF THE INVENTION

1. Field of the Invention

The invention is generally related to the inspection of nuclear fuel rods and in particular to a drive unit for driving and rotating a fuel rod in a test tank for ultrasonic inspection of the end closure weld.

2. General Background

During fabrication of nuclear fuel rods, ultrasonic (UT) inspection is performed on all fuel rod closure welds. The end of the fuel rod to be inspected is inserted horizontally through a seal into a test tank filled with water. The inspection is performed by rotating the fuel rod about its longitudinal axis and scanning the weld with the UT transducer during rotation.

Equipment commonly used in such inspections utilizes a push/pull unit located at the end of the fuel rod away from the test tank and a rotation unit located adjacent to the test tank to position and manipulate the fuel rod for the UT inspection. The carriage mounted push/pull unit travels on linear ball bushings to insert the fuel rod in the test tank and incorporates an air cylinder operated clamp to withdraw the fuel rod at the completion of the inspection cycle. Rotation of the fuel rod is provided by a 3-jaw lathe chuck which is turned by an electric motor through a timing belt drive. An electrically operated actuator opens and closes the chuck jaws. The push/pull unit pushes the leading end of the fuel rod through the electric actuator and chuck into the test tank against a retractable stop. The actuator then closes the chuck to grip the fuel rod and the motor rotates the chuck and fuel rod for the UT inspection cycle. Upon completion of the test cycle, the motor is shut off and the actuator opens the chuck jaws to release the fuel rod. The fuel rod is then drawn back from the test tank and through the chuck and actuator by the push/pull unit. During the return stroke, and after the fuel rod has cleared the chuck and actuator, the clamp on the push/pull unit opens to release the fuel rod which is left on the handling rack for transfer to the next station.

One problem presented by such equipment is the requirement of frequent maintenance due to water on the fuel rod being left on the internals of the chuck and actuator during withdrawal of the fuel rod from the test tank. Particularly after periods of disuse, rusting can cause these parts to seize, requiring disassembly and rebuilding. Another problem is that the clamping action of the 3-jaw chuck on the fuel rod causes axial displacement of the fuel rod in excess of the 0.001 inch tolerance necessary for the new seal welds. The clamping action of the 3-jaw chuck also increases the potential for damage to the fuel rod itself in the form of the fuel rod cladding being scratched and removed from the exterior of the rod or the relatively thin wall of the fuel rod being dented. The metallic cladding is important in retaining fission gas products within the fuel rod and protecting the fuel rod from the corrosive environment while dents in the fuel rod wall may limit movement of fuel pellets in the rod as they tend to change shape due to irradiation during their operational life span.

Inspection devices which applicant is aware of include the following.

U.S. Pat. No. 4,368,644 entitled "Tool For Inspecting Defects In Irregular Weld Bodies" discloses a tool which is actuated to move an ultrasonic inspection transducer over the surface of an irregular weld body such as the intersection of the nozzle of a reactor vessel to the vessel.

U.S. Pat. No. 4,660,419 entitled "Reference Standard For Calibration Of Ultrasonic Arrays" discloses the use of an array of ultrasonic transducers disposed along a circular arc for examining tubular objects moving therethrough and a calibrating cylinder having calibrating flaws therein.

U.S. Pat. No. 4,681,730 entitled "Process And Device For Detecting Leaking Nuclear Fuel Elements In A Nuclear Assembly" discloses the use of an ultrasonic transducer carried by rod means for insertion in the assembly between an end piece and the caps of the element.

U.S. Pat. No. 4,096,757 entitled "Method And Apparatus For Examining Weld Defects In Vertical Pipes By Supersonic Waves" discloses a supersonic probe on a rotary shaft revolved along the inner surface of a pipe to be examined.

U.S. Pat. No. 4,686,078 entitled "Method And Apparatus For Displacing A Reactor Weld Scanner Assembly By Variable Buoyancy" discloses the use of buoyancy chambers to move a scanner and telescopic boom into position relative to a reactor vessel.

It is seen that the known art does not address the above problems of axial displacement tolerance and water deposition on the drive unit.

SUMMARY OF THE INVENTION

The present invention addresses the aforementioned problems in a straightforward manner. What is provided is a push/pull/rotation device that is part of the automated system of transfer racks and equipment designed to feed fuel rods to and from the fuel rod end cap seal weld ultrasonic inspection system. A gripping and rotating device has a motor mounted thereon and a spindle directly coupled to the motor. A rubber gripping mechanism is accepted at one end of the spindle and has a flanged port through which air pressure is applied for gripping the end of a fuel rod to be tested. Actuation of the motor causes rotation of the spindle and fuel rod held by the gripping mechanism. The housing of the gripping and rotating device is attached to a mounting plate connected to an assembly for pushing the fuel rod into the test tanks for inspection and pulling the fuel rod out of the test tanks when the inspection is completed.

BRIEF DESCRIPTION OF THE DRAWINGS

For a further understanding of the nature and objects of the present invention reference should be had to the following description taken in conjunction with the accompanying drawings in which like parts are given like reference numerals and, wherein:

FIG. 1 is a side view of the invention.

FIG. 2 is an end view of the invention.

DETAILED DESCRIPTION OF THE PREFERRED EMBODIMENT

Figure 3:
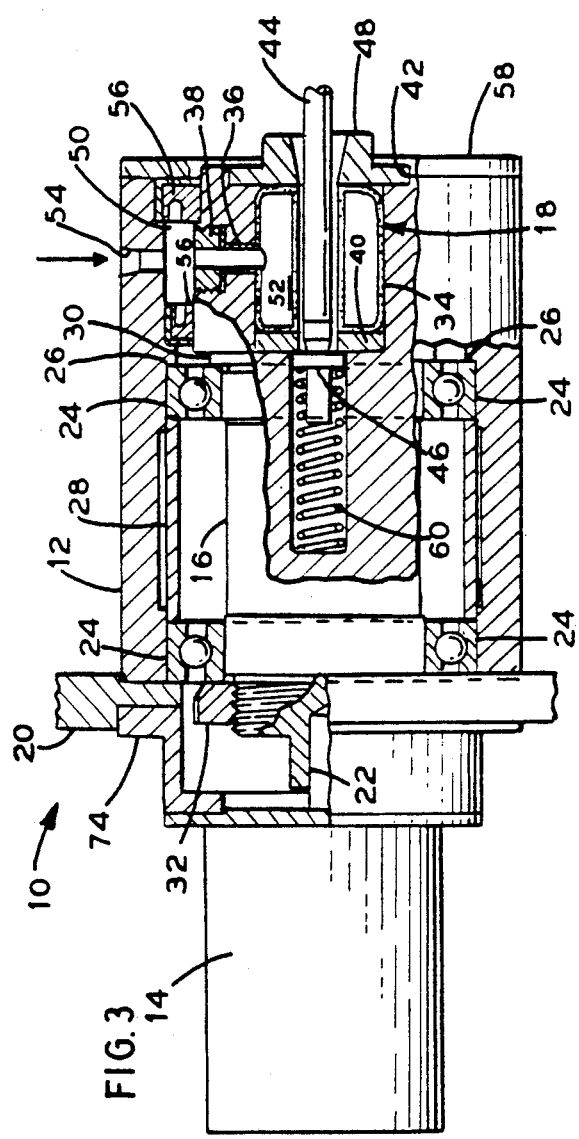
FIG. 3 is a partial cutaway view of the invention.

Referring to the drawings, it is seen in FIG. 1-3 that the invention is generally referred to by the numeral 10. Drive unit 10 is generally comprised of housing 12, drive motor 14, spindle 16, and means 18 for gripping and rotating a fuel rod in response to rotation by drive motor 14.

Housing 12 is essentially cylindrical in shape with its interior sized and adapted to receive spindle 16 and gripping and rotating means 18. Its first end is adapted to have drive motor 14 mounted thereon and also for mounting on additional related equipment to be further explained.

Drive motor 14 may be of any type suitable for the application such as a synchronous stepping motor used in the preferred embodiment. Drive motor 14 is mounted at the first end of housing 12 through the use of adapter 74 and mounting plate 20 in conjunction with any suitable means such as bolting or welding for maintaining drive motor 14 in its mounted position. As best seen in FIG. 3, drive shaft 22 extends from drive motor 14 toward the interior of housing 12 where it is directly coupled to spindle 16 for rotation thereof in response to driving rotation by drive motor 14.

Spindle 16 is cylindrical in shape and rotates on bearings 24. The outer races of bearings 24 are held in their installed position between shoulder 26 on the inner diameter of housing 12 and mounting plate 20. Spacer 28 between the races of bearings 24 serves to maintain bearings 24 in their proper position. Spindle 16 is restrained axially by the inner races of bearings 24 which abut shoulder 30 on spindle 16 and bearing locknut 32. Although not shown, a lockwasher may be used in conjunction with locknut 32. The forward end of spindle 16 is recessed and adapted to accept means 18 for gripping and rotating a fuel rod in response to driving rotation by drive motor 14.

Means 18 is formed from a substantially donut shaped rubber bladder 34 having a single flanged port 36 that extends radially from rubber bladder 34. Flanged port 36 extends through a radial bore in spindle 16 and is locked in place by a threaded hollow plug 38. A washer may also be used between plug 38 and flanged port 36 to prevent twisting and deformation of flanged port 36 when plug 38 is threaded into spindle 16 and torqued down on flanged port 36. A set screw, not shown, may be used to prevent plug 38 from backing out of its installed position during operations. One end of rubber bladder 34, the rear side facing the interior of spindle 16 is constrained or prevented from moving longitudinally by first retaining ring 40. The opposite end of rubber bladder 34, the forward end facing exterior of spindle 16 and housing 12, is prevented from moving longitudinally by second retaining ring 42. Each retaining ring is provided with a central bore therethrough. The bore in first retaining ring 40 allows the end of fuel rod 44 to bear against plunger 46 which will be explained below. The bore in second retaining ring 42 is frustoconical in cross section and tapers inwardly toward rubber bladder 34. This serves as a lead-in for properly directing the end of fuel rod 44 through the center of rubber bladder 34 as seen in FIG. 3. Second retaining ring 42 is also provided with a thickened center portion or shoulder 48. It can be seen that rubber bladder 34 rotates in conjunction with spindle 16 in response to driving rotation by drive motor 14.

Flanged port 36 rotates in annular space 50 between the inner diameter of housing 12 and the outer diameter of spindle 16. The interior 52 of rubber bladder 34 is thus in fluid communication with annular space 50 and is also in fluid communication with the atmosphere exterior to housing 12 or a fluid source such as compressed air by means of radial bore 54 in housing 12. Radial bore 54 may be of any suitable size but in the preferred embodiment is a ¼ inch pipe tap convenient for attachment to a compressed air source not shown. In this manner, directing compressed air into interior 52 of rubber bladder 34 causes radial inward expansion of rubber bladder 34 which results in gripping of fuel rod 44. Rotation of spindle 16 by drive motor 14 is thus imparted to fuel rod 44 by rubber bladder 34. Air pressure is retained in annular space 50 by mechanical seals 56. Mechanical seal 56 adjacent the end of housing 12 is held in position against air pressure by end cap 58 on housing 12.

Plunger 46 is slidably received in a longitudinal bore of spindle 16 and is biased against first retaining ring 40 by compression spring 60. The spring absorbs the overtravel as the drive unit completes its stroke, i.e., when the fuel rod contacts the retractable stop in the UT test tank. This provides a means of allowing a certain amount of overtravel by drive unit 10 as it is pushed into position to engage fuel rod 44. Any overtravel is absorbed by plunger 46 against compression spring 60, thus preventing damage to fuel rod 10 during inspection procedures.

Figure 4:
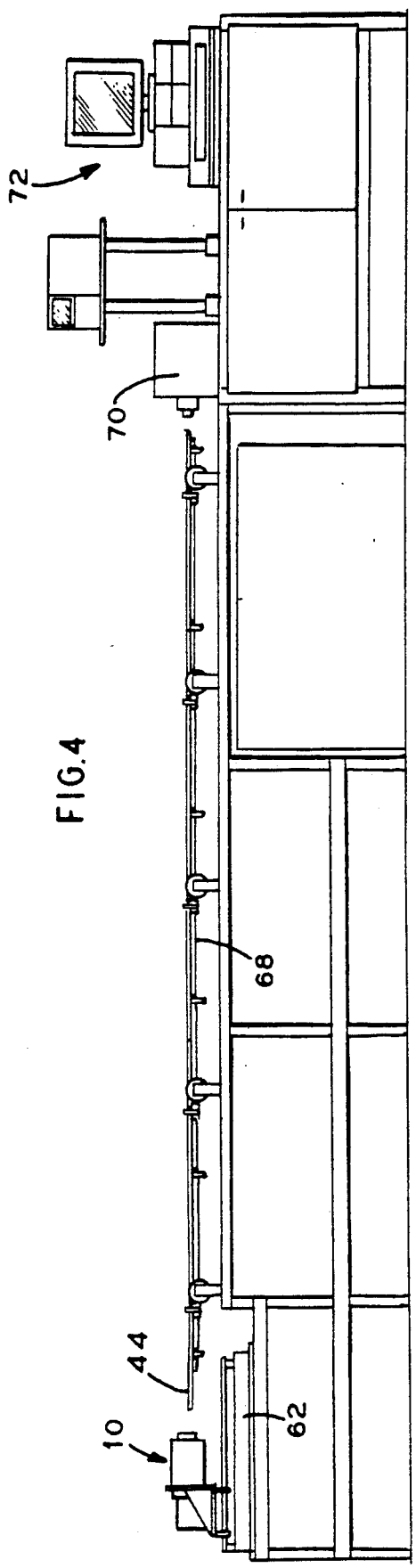
FIG. 4 illustrates the invention installed in its operating position.

As best seen in FIG. 1 and 2, drive unit 10 is connected to push/pull unit 62 by means of mounting plate 20. The lower portion of mounting plate 20 has linear ball bushings 64 slidably received on tracks 66 and is operatively engaged with push/pull unit 62 such that push/pull unit 62 causes forward and backward movement of mounting plate 20 and drive unit 10 over tracks 66. In operation push/pull unit 62 positions drive unit 10 at its rearward position as seen in FIG. 4. After fuel rod 44 is positioned on transfer rack 68 in line with drive unit 10, push/pull unit 62 causes forward movement of drive unit 10 whereby the end fuel of fuel rod 44 is received in the center of rubber bladder 34 as seen in FIG. 3 and the opposite end of fuel rod 44 is pushed into UT test tank 70. Note a slight amount of overtravel is designed into the system to ensure positive contact between the fuel rod and the retractable stop in the UT tank. Overtravel of drive unit 10 is compensated for by plunger 46 and compression spring 60. Compressed air is directed from a source not shown through radial bore 54 into interior 52 of rubber bladder 34, causing it to expand radially inward and grip fuel rod 44. Drive motor 14 is then engaged, causing rotation of spindle 16, rubber bladder 34, and fuel rod 44 while ultrasonic inspection equipment inside UT test tank 70 performs the inspection of the weld at the end of fuel rod 44. The results of the inspection are displayed and recorded on associated test equipment 72. After the test cycle is completed, drive motor 14 is shut off and push/pull unit 62 causes backward movement of drive unit 10 and retraction of fuel rod 44 from UT test tank 70. During the retraction stroke air pressure is released from rubber bladder 34 so that fuel rod 44 is released and left on transfer rack 68. Fuel rod 44 is then transferred to the next processing station and another fuel rod is positioned on transfer rack 68 for the same inspection procedure.

Because many varying and differing embodiments may be made within the scope of the inventive concept herein taught and because many variations may be made in the embodiment herein detailed in accordance with the descriptive requirement of the law, it is to be understood that the details herein are to be interpreted as illustrative and not in a limiting sense.

What is claimed as invention is:

1. A drive unit for use in inspecting nuclear fuel rods, comprising:
   a. a housing;
   b. a drive motor mounted at the first end of said housing;
   c. a spindle directly coupled to said drive motor and rotatably mounted in said housing; and
   d. means mounted in said spindle adjacent the second end of said housing for gripping a fuel rod, comprising:
      i. a substantially donut shaped rubber bladder;
      ii. a flanged port extending radially from said bladder and in fluid communication with the interior thereof.

2. The drive unit of claim 1, wherein said spindle is rotatably mounted on bearings in said housing.

3. The drive unit of claim 1, further comprising a plunger slidably received in a longitudinal bore in said spindle and biased toward said gripping means.

4. A drive unit for use in inspecting nuclear fuel rods, comprising:
   a. a housing;
   b. a drive motor mounted at the first end of said housing;
   c. a spindle directly coupled to said drive motor rotatably mounted on bearings in said housing and having a recess at its end adjacent the second end of said housing; and
   d. means received in the recess of said spindle for gripping a fuel rod, comprising:
      i. a substantially donut shaped rubber bladder having its longitudinal axis coaxial with that of said spindle; and
      ii. a flanged port extending radially from said bladder and in fluid communication with the interior thereof.

5. The drive unit of claim 4, further comprising a plunger slidably received in a longitudinal bore in said spindle and biased toward said gripping means.

6. A drive unit for use in inspecting nuclear fuel rods, comprising:
   a. a housing;
   b. a drive motor mounted at the first end of said housing;
   c. a spindle directly coupled to said drive motor rotatably mounted on bearings in said housing and having a recess at its end adjacent the second end of said housing;
   d. a substantially donut shaped rubber bladder received in said recess and having its longitudinal axis coaxial with that of said spindle whereby said bladder rotates in conjunction with said spindle in response to driving rotation by said drive motor; and
   e. a flanged port extending radially from said bladder and in fluid communication with the interior thereof whereby said bladder may be pressurized, causing radial internal expansion thereof for gripping a fuel rod.

7. The drive unit of claim 6, further comprising a plunger slidably received in a longitudinal bore in said spindle and biased toward said rubber bladder.

* * * * *